(12) United States Patent
Han et al.

(10) Patent No.: US 8,378,006 B2
(45) Date of Patent: Feb. 19, 2013

(54) COMPOSITION OF DECOLORABLE INK AND DECOLORING METHOD

(76) Inventors: Jong-Soo Han, Daejeon (KR); Woon Chang Paik, Chungbuk (KR); Hyun-Man Shin, Daejeon (KR); Yeong-Gweon Lim, Daejeon (KR); Yong-Hwan Choi, Daejeon (KR)

( * ) Notice: Subject to any disclaimer, the term of this patent is extended or adjusted under 35 U.S.C. 154(b) by 295 days.

(21) Appl. No.: 12/739,897

(22) PCT Filed: Oct. 6, 2008

(86) PCT No.: PCT/KR2008/005850
§ 371 (c)(1),
(2), (4) Date: Apr. 26, 2010

(87) PCT Pub. No.: WO2009/054621
PCT Pub. Date: Apr. 30, 2009

(65) Prior Publication Data
US 2010/0255215 A1  Oct. 7, 2010

(30) Foreign Application Priority Data

Oct. 25, 2007 (KR) ........................ 10-2007-0107608

(51) Int. Cl.
| | |
|---|---|
| B60C 1/00 | (2006.01) |
| B41J 2/32 | (2006.01) |
| B41J 2/315 | (2006.01) |
| B41J 2/325 | (2006.01) |
| B41J 15/10 | (2006.01) |
| B41J 29/16 | (2006.01) |
| C08G 73/10 | (2006.01) |
| C08J 3/00 | (2006.01) |
| C08K 5/06 | (2006.01) |
| C08K 5/24 | (2006.01) |
| C09D 1/00 | (2006.01) |
| C09D 3/00 | (2006.01) |
| C09D 4/00 | (2006.01) |
| C09D 5/00 | (2006.01) |
| C09D 11/00 | (2006.01) |
| C09D 11/10 | (2006.01) |
| C09J 7/02 | (2006.01) |
| C09K 3/00 | (2006.01) |
| G01D 15/04 | (2006.01) |
| G01D 15/10 | (2006.01) |
| G01D 15/20 | (2006.01) |
| G03C 11/00 | (2006.01) |

(52) U.S. Cl. .................. 523/160; 106/31.01; 106/31.13; 106/31.32; 106/31.43; 106/315.59; 106/31.97; 346/78; 347/171; 347/179; 400/120.01; 430/19; 523/161; 524/261; 524/366; 524/376; 524/377

(58) Field of Classification Search .................. 523/160, 523/161; 106/31.01, 31.13, 31.32, 31.43, 106/31.59, 31.97; 346/78; 347/171, 179; 400/120.01; 430/19; 524/261, 366, 376, 400/377

See application file for complete search history.

(56) References Cited

U.S. PATENT DOCUMENTS

| | | | |
|---|---|---|---|
| 5,643,701 A | 7/1997 | Nohr et al. | |
| 5,683,843 A | 11/1997 | Nohr et al. | |
| 5,700,850 A * | 12/1997 | Nohr et al. | ........................ 522/34 |
| 5,721,287 A | 2/1998 | Nohr et al. | |
| 5,922,115 A | 7/1999 | Sano et al. | |
| 6,017,386 A | 1/2000 | Sano et al. | |
| 6,017,471 A | 1/2000 | MacDonald et al. | |
| 6,017,661 A | 1/2000 | Lindsay et al. | |
| 6,033,465 A | 3/2000 | MacDonald et al. | |
| 6,060,200 A | 5/2000 | Nohr et al. | |
| 6,063,551 A | 5/2000 | Nohr et al. | |
| 6,120,949 A | 9/2000 | Nohr et al. | |
| 6,127,073 A | 10/2000 | Nohr et al. | |
| 6,235,095 B1 | 5/2001 | Nohr et al. | |
| 6,342,305 B1 | 1/2002 | MacDonald et al. | |
| 6,790,809 B2 | 9/2004 | Suzuki | |
| 2005/0011404 A1 | 1/2005 | Patel et al. | |
| 2005/0158471 A1 | 7/2005 | Davies-Smith et al. | |

FOREIGN PATENT DOCUMENTS

| | | | |
|---|---|---|---|
| JP | 05-294063 | * | 11/1993 |
| JP | 7304984 A | | 11/1995 |
| JP | 9286979 A | | 11/1997 |
| KR | 100536056 B1 | | 1/2005 |

OTHER PUBLICATIONS

Definition of "auxochrome" from Hawley's Condensed chemical Dictionary, 14th Edition, Copyright (c) 2002 by John Wiley & Sons, Inc.*

Machine English Translation of JP 05-294063, Goto et al., Nov. 1993.*

Zollinger, Heinrich, "Color Chemistry Syntheses, Properties and Applications of Organic Dyes and Pigments", 1987, pp. 288-303, VCH Verlagsgesellschaft mbH.

* cited by examiner

*Primary Examiner* — Patrick Niland
(74) *Attorney, Agent, or Firm* — The Webb Law Firm

(57) ABSTRACT

The present invention is a method which erase information printed on a recording medium if necessary and thus reuse the recording medium, and includes 1) decolorable ink compositions which are not erased during the use but erased by a dye readily decolorable by a decolorant, 2) a decolorant composition including a thermal initiator or photoinitiator, and 3) a method for coating the decolorant and applying heat or irradiating UV to erase the dye. According to the present invention, it is possible to prepare various writing inks, and particularly, when applied to recording medium with a magnetic stripe as well as the general purpose papers, it is possible to reduce the production cost significantly, obtain a large import substitution effect of the magnetic ink all of which are imported, and largely reduce the environmental pollution.

13 Claims, No Drawings

COMPOSITION OF DECOLORABLE INK AND DECOLORING METHOD

TECHNICAL FIELD

The present invention relates to an ink composition readily decolorable by a decolorant, a decolorant for decoloring a printed ink and a method for decoloring the printed ink, in order to erase information printed on a recording medium if necessary and thus reuse the recording medium.

BACKGROUND ART

With development of industries, an amount of use of papers including public relation medium as well as general documents tends to be drastically increased. Therefore, forests are destroyed as the supply of pulp which is raw material for the paper is increased and the problem due to global warming becomes serious.

An organic dye for showing the color of ink consists of a chromophore and an auxochrome. In general, examples for the chromophore include an azo group (—N=N—), a carbonyl group (>C=O), a nitro group (—NO$_2$), a thiocarbonyl group (>C=S), a nitroso group (—N=O), an ethylene linkage (—C=C—) and a cyano group ((—C=N—), and examples for the auxochrome include an amino group (—NH$_2$), a secondary amino group (—NHR), a tertiary amino group (—NR$_2$), a hydroxyl group (—OH), a sulfone group (SO$_3$), a carboxyl group (—COOH), a mercapto group (—SH), an alkoxy group (—OR) and a halide (—X). The auxochrome improves color strength and dyeability. This auxochrome also improves reactivity since it has a non-bonding electron.

One of a material which readily reacts with the dye and thus decolors the dye is a molecular reaction mechanism in which a bleaching agent (ion) freed from an acid reacts with the dye, and the other is an active oxygen mechanism in which a hydroxy radical (.OH), a peroxy radical (.OOH) or a superoxide radical (.O$_2$—) reacts with the dye.

However, the above compounds oxidate a recording medium and decolor the color of the recording medium or damage the recording medium.

A more stable reaction mechanism which decolors the dye is a method using an organic compound which readily forms a radical by heat or light. These react with other organic compound to form high molecular material or react with the auxochrome of the dye to destroy the chromophore, thereby decoloring the dye. This reaction is a reaction mechanism named as a Dulux process, in which the dye is destroyed by readily reacting with a material readily generating the radical by the heat or light (Heinrich Zollinger, COLOR CHEMISTRY pp. 288-303, VCH (1971)).

Also, a rewritable marking material is used which is referred to as a Leuco dye and can repeatedly alternate between colored and decolored states as its molecular structure is transformed by the heat or light. The rewritable marking material refers a marking material in which an image is formed when energy is given, the image is maintained as it is when the energy is not given any more and the image is disappeared to be reusable when other energy is given. There are various rewritable marking materials and a thermally rewritable marking material is largely used.

This thermally rewritable marking material includes a high molecular/low molecular composite type, a high molecular type and a Leuco dye type. The Leuco dye type is one using color tone change, in which the Leuco dye of two-component dye systems is employed as a pigment and reaction of the dye with a decolorant is used. The Leuco dye which is generally used as a thermal transfer ink is widely used for the purpose of recording, and this thermally rewritable marking material is widely used as it has excellent resolution and stability. However, the thermally rewritable marking material has insufficient repetitivity and is gradually decolored by the heat or light. Therefore, the thermally rewritable marking material is not suitable for long-term storage documents.

In a more developed method for decoloring the dye, the dye is contained in a clathrate compound such as dextrin and a photo decolorant is chemically coupled to the outside thereof, which is used as an ink for toner of a laser beam printer. The aforementioned method has been continuously studied by R. S. Nohr team of Kimberly-Clark (U.S. Pat. No. 5,643,701, U.S. Pat. No. 5,683,843, U.S. Pat. No. 5,721,287, U.S. Pat. No. 6,017,471, U.S. Pat. No. 6,017,661, U.S. Pat. No. 6,017,661, U.S. Pat. No. 6,033,465, U.S. Pat. No. 6,060,200, U.S. Pat. No. 6,120,949, U.S. Pat. No. 6,127,073, U.S. Pat. No. 6,235,095 and U.S. Pat. No. 6,342,305).

Also, studies for the Leuco dye of the same structure are disclosed in U.S. Pat. No. 6,017,386, U.S. Pat. No. 5,922,115, U.S. Pat. No. 6,063,551 and U.S. Pat. No. 6,790,809.

The aforementioned method has a disadvantage that the color is gradually discolored in long-term storage as described in U.S. Pat. No. 6,342,305 or lately suggested method. Also, the method is not able to be applied to liquid inks such as a printing ink, a ribbon ink, a Deskjet ink, inks for various writing instruments, other than the case that the ink is present in solid state such as the toner of the laser beam printer, since the inks are decolored during storage or use thereof as the dye and the decolorant are dissolved in solvent to react with each other.

In addition, although the clathrate compound is not dissolved in the solvent, the clathrate compound may be broken by friction with the recording medium upon recording. In the case of the ribbon ink, since the ink dyed in the ribbon is printed by a dot impact manner, the clathrate compound is broken to cause discoloration of the ribbon.

Particularly, as disclosed by the present applicant in Korean Patent No. 0536056, parking tickets or highway tickets may be exposed at a high temperature of 70 to 100° C. and sunlight and information printed thereon may thus be erased under sever condition. Therefore, although it is theoretically possible to prepare an ink for general purpose other than special purpose using the dye and the decolorant together, there are actually many problems.

Another method (JP1997-286979) has been suggested to provide a decoloring composition, in which an ink is prepared as a mixture with a photo-decolorant and an accelerator and a printed ink can be erased by irradiation of light. Although the patent insists that its ink is decolored only when ultra violet ray (UV) of a predetermined wavelength is irradiated, the patent does not give a specific description how the ink is not discolored by a photo-radical former when exposed to the sunlight during use. Therefore, the patent cannot give the scientific basis how the ink is not discolored during storage and use. Particularly, in a case that the recording medium is a paper, the dye component and hydroxyl group (—OH) in cellulose which constitutes the paper are chemically bonded with each other. Therefore, the ink is not readily erased and an afterimage may be remained on the paper.

Accordingly, although it is theoretically possible to prepare an ink for general purpose other than special purpose using the dye and the decolorant together, there are actually many problems.

Meanwhile, the paper is recycled by removing the ink printed thereon and then remanufacturing it as a recycled paper in a paper mill. However, there are disadvantages that the recycled paper has degraded quality and complex recycling process is required.

Therefore, so far, not only a general-purpose paper but also paper and recording medium including various pass cards which are specially printed and have high preparation cost are discarded after a single use. However, according to an embodiment of the present invention, it is possible to use the recording medium several times or semi-permanently and thus an enormous economic effect can be expected.

Particularly, confidential papers which require to be kept in secret are generally shred or burned up. However, according to the present invention, the content recorded on the recording medium is readily erased and the recording medium can be reused since the printed ink itself is chemically decomposed. Particularly, a pass card or identification card having a magnetic stripe attached thereon is an expensive printed matter which is used in a large amount. However, it has to be burned up so far as it cannot be recycled and causes an environmental problem as the magnetic stripe is not decomposed after discarded. Therefore, repeated use of the paper with the magnetic stripe can largely reduce the environmental problem. Also, a large import substitution effect can be expected by the repeated use of the paper with the magnetic stripe since the material for the magnetic stripe is all imported.

DISCLOSURE

Technical Problem

An object of the present invention is to provide an ink composition readily decolorable by a decolorant and a decolorant for decoloring an ink printed on a recording medium. Another object of the present invention is to provide a method for decoloring a printed ink readily, quickly and completely and a method for allowing a recording medium to be reused.

Technical Solution

The present invention provides an ink composition readily decolorable by a decolorant, a decolorant for decoloring a printed ink and a method for decoloring a printed ink.

The ink composition according to the present invention includes a dye readily decolored by a decolorant, a decoloring accelerator and a stabilizer for inactivating the decoloring accelerator, and may further include, as additives, a viscosity modifier, a surfactant, an aseptic, other additives, solvent according to properties of various inks.

Meanwhile, the decolorant includes thermal initiator or UV photoinitiator and an organic solvent, and is coated on a recording medium printed with the ink composition to decolor the ink. Also, the method for decoloring the ink printed on the recording medium is to coat the decolorant on the recording medium printed with the ink composition and apply heat or irradiate light, and is characterized in that the ink printed on the recording medium is decolored quickly and completely.

Also, the term "recording medium" refers to various papers and cards that can be printed with the ink according to the present invention.

Hereinafter, the present invention will be described in more detail.

An ink composition according to the present invention is composed of a dye having a molecular structure in which an auxochrome is substituted at first to third carbon positions from which a carbon is substituted chromophore, a decoloring accelerator and a stabilizer.

An organic dye is used as the ink composition according to the present invention and it is preferable for enhancing the decoloring effect that the auxochrome is placed at first to third carbon positions from which a carbon is substituted chromophore in the molecular structure of the dye. When two or more chromophores are present within one dye molecule, it is preferable that the auxochrome is placed adjacent to the respective chromophores. Also, it is important to select the dye having a structure in that the chromophore and the auxochrome are adjacent to each other, and the proximity must be determined not by the proximity in a chemical formula but in consideration of a three-dimensional structure of the molecule.

The dye is selected, but not limited to, from direct red 2, direct red 28, direct red 75, direct red 111, direct red 112, direct brown 106, direct blue 71, direct yellow 24, direct orange 61, disperse red 1, disperse red 13, disperse red 19, disperse red 60, disperse red 200, disperse violet 1, disperse violet 4, disperse black 1, disperse black 3, disperse black 7, disperse blue 1, disperse blue 3, disperse blue 14, disperse blue 19, disperse blue 79, disperse blue 134, disperse blue 183, disperse yellow 3, disperse yellow 54 or disperse orange 3, disperse orange 10, reactive blue 5, reactive blue 19, basic green 1, basic green 2B, basic green 4, basic green 6B, basic red 9, basic violet 1, basic violet 2, basic violet 3, basic violet 4, basic violet 14, basic violet 23, basic blue 1, basic blue 7, basic blue 8, basic blue 11, basic blue 15, basic blue 18, basic blue 20, basic blue 26, basic yellow 2, basic orange 2, solvent green 1, solvent red 5, solvent red 27, solvent violet 9, solvent brown 2, solvent blue 4, solvent blue 5, solvent blue 6, solvent blue 14, solvent blue 18, solvent blue 23, solvent blue 36, solvent yellow 1, solvent yellow 5, solvent yellow 56, solvent yellow 58, solvent orange 52, solvent orange 53, sulphur violet 2, acid green 1, acid green 4, acid green 5, acid red 37, acid red 53, acid violet 1, acid violet 19, acid violet 25, acid violet 73, acid brown 43, acid black 1, acid black 47, acid black 132, acid blue 6, acid blue 22, acid blue 24, acid blue 25, acid blue 27, acid blue 40, acid blue 56, acid blue 62, acid blue 74, acid blue 93, acid blue 145, acid orange 10. A content of the dye is 1 to 80% by weight of for total weight of the ink composition. When the content of the dye is less than 1% by weight, the color is too blurred to recognize the printed content. On the contrary, when the content of the dye exceeds 80% by weight, the viscosity becomes too high and it is thus difficult to prepare the ink.

Meanwhile, the decoloring accelerator is a compound that accelerates formation of a radical, by which the radical is formed very quickly when the decolorant is coated on the recording medium. However, when the decoloring accelerator and the dye are mixed, the dye is gradually decolored. Therefore, the decoloring accelerator is first inactivated by being reacted with the stabilizer that inactivates the decoloring accelerator and the dye is then added thereto, so that the dye is stably present in the ink. If necessary, the decolorant is coated on the recording medium printed with the ink to break the equilibrium of the ink. Then, the ink is removed quickly and completely as the ink is readily swelled and reacted.

The decoloring accelerator used in the ink composition according to the present invention may include a redox compound and an amino radical accelerator. Examples of the redox compound includes, but not limited to, zinc, lead, zinc nitrate including cadmium, zinc compound of aliphatic soap, lead carbonate, lead phthalate, cadmium laurite and cadmium compound of aliphatic soap. Examples of the amino radical accelerator includes, but not limited to, amines selected from dimethylaminoethyl methacrylate, n-butylamine, triethylamine, 4-dimethylamino isoamyl benzoate, dicyandiamide, benzyldimethylamine, 4-(dimethylamino)-N,N-dimethylbenzylamine, 4-methoxy-N,N-dimethylbenzylamine, 4-methyl-N,N-dimethylbenzylamine and melamine; imidazole derivatives selected from imidazole, 2-methylimidazole, 2-ethylimidazole, 2-ethyl-4-methylimidazole, 2-phenylimidazole, 4-phenylimidazole, 1-cyanoethyl-2-phenylimidazole and 1-(2-cyanoethyl)-2-ethyl-4-methylimidazole; guanamines selected from guanamine, acetguanamine and benzoguanamine; and tertiary amino alcohols selected from polyoxyethylenelaurylamine, ethanolamine, triethanolamine and diethanolamine.

The stabilizer used in the present invention prevents that the dye is coupled with the decoloring accelerator to be decolored and also inhibits that the dye is hydrogen bonded to the recording medium. Examples of the stabilizer may include, but not limited to, one or a mixture of two or more selected from chloride selected from maleic acid, fumaric acid and stearyl acid, phthalic anhydride, hydroquinone, naphthalenediol, oxime, aliphatic amines, sulfur compounds, ketones, aldehydes, phosphates and aliphatic organic acids selected from C10-C22 saturated or unsaturated fatty acid and natural fatty acid oil.

The decoloring accelerator has a characteristic that it reacts with the dye to gradually decolor the dye at a room temperature. The stabilizer increases pigmentation effect by hydrogen bond between a paper and a functional group with a non-bonding electron included in the stabilizer molecule when it is used as a mixture with the dye, and a portion where the dye is not readily removed is thus generated. Therefore, in order to solve the problem that the dye is decolored at a room temperature during the use and the problem that the dye is not readily removed upon decolorization at the same time.

The decoloring accelerator and the stabilizer have to be quantitively used and may be used in an equivalence ratio of 1:1 to 1:3 in consideration of a chemical bonding form of them. More preferably, they are used in the same equivalence ratio. The content of the reaction product between the decoloring accelerator and the stabilizer is 1 to 95% by weight for the total weight of the ink composition. When the content is less than 1% by weight, the decoloring accelerator and the stabilizer cannot work properly. On the contrary, when the content exceeds 95% by weight, the color of the printed ink is too blurred.

The ink composition according to the present invention may further include a surfactant, a developer and a solvent other than the dye, the reaction product between the decoloring accelerator and the stabilizer.

The surfactant is an additive for dissolving the dye component of the printed ink in the ink composition other than the dye. Examples of the surfactant may include, but not limited to, one or a mixture of two or more selected from polyoxyethylene alkyl ethers of polyoxyethylene lauryl ether, polyoxyethylene stearyl ether, polyoxyethylene cetyl ether and polyoxyethylene oleyl ether; polyoxyethylene alkylaryl ethers of polyoxyethylene octylphenyl ether and polyoxyethylene nonylphenyl ether; polyoxyethylene polyoxypropylene block copolymers; sorbitan esters of fatty acids of sorbitan monolaurate, sorbitan monopalmitate, sorbitan monostearate, sorbitan monooleate, sorbitan trioleate and sorbitan tristearate; polyoxyethylene sorbitan esters of fatty acids of polyoxyethylene sorbitan monolaurate, polyoxyethylene sorbitan monopalmitate, polyoxyethylene sorbitan monostearate, polyoxyethylene sorbitan trioleate and polyoxyethylene sorbitan tristearate; fluorosurfactants; and silicon surfactants.

The content of the surfactant is preferably 0.1 to 50% by weight of for total weight of the ink composition though it may vary as the kind or the properties of the surfactant. When the content is less than 0.1% by weight, the dye is not dispersed in the solvent. On the contrary, when the content exceeds 50% by weight, the ink spreads on upon printing and an afterimage may remain after decolored.

Also, the developer raising a solubility of the dye and making the color to be clear includes aliphatic alcohols or aromatic alcohols. The content of the developer is preferably 1 to 20% by weight for total weight of the ink composition since excessive use of the developer makes the dye coupled to the recording medium not to be completely erased.

Also, the solvent used in the present invention includes a hydrophobic solvent and a hydrophilic solvent in the form of capable of diluting and weighting the ink. In a case of an oil ink, examples of the hydrophobic solvent include, but not limited to, paraffin oil and mineral oil. In a case of an aqueous ink, examples of the hydrophilic solvent include, but not limited to, water and alcohols. The content of the solvent is preferably 1 to 90% by weight of for total weight of the ink composition.

In the ink composition as described above which includes the dye readily erasable by the decolorant, the ink is readily swelled by the decolorant even when the ink is printed and dried on the recording medium and can be erased quickly and completely as the decolorant penetrates into the ink. Also, pigmentation by hydrogen bond with a hydroxyl group in the cellulose which is a component of a paper is reduced in a case that the recording medium is the paper.

In addition, it is possible to prepare an ink for a ribbon cartridge, a Deskjet ink and inks for various writing instruments based on the ink composition by adding suitable solvent or other additives in consideration of physical and chemical properties according to the uses.

The decolorant according to the present invention includes an initiator selected from a thermal initiator, UV photoinitiator and a mixture thereof; and an organic solvent, and is coated on the recording medium printed with the ink according to the present invention to decolor the ink.

The thermal initiator is a compound which forms a radical by application of heat and thus readily reacts with the dye, and peroxides, azo compounds and redox initiator may be used as the thermal initiator. Specifically, examples of the thermal initiator may include one or a mixture of two or more selected from peroxides of benzoyl peroxide, p-chlorobenzoyl peroxide, t-butyl peroxide, t-butyl hydroperoxide, succinate peroxide, didecanoyl peroxide, cumene hydroperoxide, dicumyl peroxide, lauroyl peroxide, 2,4-pentadione peroxide, diisopropyl peroxide, di-2-ethylhexyl peroxycarbonate, t-butyl peroxybenzoate, t-butyl peroxypivalate, t-butyl peracetate, cyclohexanone peroxide, t-amyl peroxybenzoate, peracetic acid, 2,2-bis(t-butylperoxy)butane, 1,1-bis(t-butylperoxy) cyclohexane, 2,5-bis(t-butylperoxy)-2,5-dimethylhexane, 2,5-bis(t-butylperoxy)-2,5-dimethyl-3-hexine, bis(1-(t-butylperoxy)-1-methylethyl)benzene and 1,1-bis(t-butylperoxy)-3,3,5-trimethylcycloheane; azo compounds of 4,4-azobis(4-cyanovaleric acid), 1,1'-azobis(cyclohexane carbonitrile), 2,2'-azobisisobutyronitrile (AIBN) and azobis-2,4-dimethylvaleronitrile; and redox initiators of hydrogen peroxide-iron(II) salt, peroxodisulfate, potassium persulfate, sodium hydrogen sulfite and cumene hydroperoxide-iron(II) salt.

The UV photoinitiator is a compound which forms a radical by irradiation of UV and thus readily reacts with the dye, and acetophenone compounds, benzophenone compounds, halogen compounds, carbonyl compounds, dicarbonyl compounds, benzoin ether compounds, aminocarbonyl compounds, organic peroxides, diphenyl halonium salts, aromatic ketones, tertiary amines, ketal compounds, thiol compounds, halide compounds, heterocyclic compounds, polycyclic compounds, bisimidazole compounds, N-allylglycidyl compounds, arcridine compounds, peroxy keta, azo compounds, iron-arene complex or titanocene compounds may be used as the UV photoinitiator.

Specific examples of the UV photoinitiator may include one or a mixture of two or more selected from acetophenone compounds selected from acetophenone, propiophenone, 2-hydroxy-2-methyl-1-phenylpropan-1-one, 1-(4-isopropylphenyl)-2-hydroxy-2-methylpropan-1-one, 1-[4-(2-hydroxyethoxy)phenyl]-2-hydroxy-2-methylpropan-1-one, dimethoxyacetophenone, diethoxyacetophenone, 2,2-dimethoxy-1,2-diphenylethane-1-one, 2,2-diethoxy-1,2-diphenylethane-1-one, 2,2-dimethoxy-2-phenylacetophenone, 2,2-dimethoxy-2-phenylacetophenone, 2,2-diethoxy-2-phenylacetophenone, dichloroacetophenone, p-tert-butyltrichloroacetophenone, trichloroacetophenone, N,N-dimethylaminoacetophenone, p-dimethylaminopropiophenone, 2-methyl-1-(4-methylthiophenyl)-2-morpholinopropane-1-one, 2-benzyl-2-dimethylamino-1-(4-morpholinophenyl)butane-1-one, 1-phenyl-1,2-propanedione-2-(o-ethoxycarbonyl)oxime, 3,6-bis(2-methyl-2-morpholinopropanoyl)-9-butylcarbazol, α-hydroxyisobutylphenone, α,α'-dichloro-4-phenoxyacetophenone, 1-hydroxy-1-cyclohexylacetophenone and diacetylacetophenone; benzophenone compounds selected from benzophenone, 4-methylbenzophenone, 4-phenylbenzophenone, 2-chlorobenzophenone, 4,4'-dichlorobenzophenone, 2,4,6-trimethylbenzophenone, o-benzoylbenzonate methyl, 4-(4-methylthio)benzophenone, 4,4'-bisdimethylaminobenzophenone, 4,4'-bisdiethylaminobenzophenone, Michler's ketone, 4-benzoyl-4'-methyldiphenylsulfide, 3,3-dimethyl-4-methylbenzophenone, 4-(1,3-acryloyl-1,4,7,10, 13-pentaoxamidecyl)benzophenone, 3,3',4,4'-tetra(tert-butylperoxycarbonyl)benzophenone; halogen compounds selected from 4-benzoyl-N,N,N-methylbenzenemethaneamminiumchloride, 2-hydroxy-3(4-benzoylphenoxy)-N,N,N-trimethyl-1-propaneamminiumchloride, 4-benzoyl-N,N-dimethyl-N-[(2-(1-oxo-2-propenoxy)ethyl)-benzenemethaneamminiumchloride and 4-benzoyl-N,N-dimethyl-N-[(2-(1-oxo-2-propenoxy)ethyl)-benzenemethaneamminiumbromide; carbonyl compounds selected from thioxanthone, 2 chlorothioxanthone, 2-isopropylthioisopropylthioxanthone, 4-isopropylthioxanthone, 2,4-dimethylthioxanthone, 2,4-diethylthioxanthone, 2,4-diisopropylthioxanthone, 2,4-dichlorothioxanthone, 1-chloro-4-propoxythioxanthone, 2-hydroxy-3-(3,4-dimethyl-9-oxo-9H-thioxanthone-2-il-oxy)-N,N,N-trimethyl-1-propaneamminiumchloride and 2-benzoylmethylene-3-methylnaphtho(1,2-d)thiazoline; dicarbonyl compounds selected from benzyl, 1,7,7-trimethyl-bicyclo[2,2,1]heptanes-2,3-dione (also referred to as camphorquinone), 2-methylanthraquinone, 2-ethylanthraquinone, 2-tert-butylanthraquinone, 1-chloroanthraquinone, 2-aminoanthraquinone, 2,3-diphenylanthraquinone, 9,10-phenanthrenequinone and methyl a-oxobenzene acetate; benzoin ether compounds selected from benzoin(2-hydroxy-1,2-diphenylethanone), benzoinmethylether(2-methoxy-1,2-diphenylethanone), benzomethylether(2-ethoxy-1,2-diphenylethanone), benzoinisopropylether(2-isopropoxy-1,2-diphenylethanone), benzoin-n-butylether(2-butoxy-1,2-diphenylethanone) and benzoinisobutylether(2-isobutoxy-1,2-diphenylethanone); aryiphosphine oxide compounds selected from 2,4,6-trimethylbenzoyldiphenylphosphine oxide and bis(2,6-dichlorobenzoyl)-(4-n-propylphenyl)phosphine oxide; aminocarbonyl compounds selected from methyl 4-dimethylaminobenzoate, ethyl 4-dimethylaminobenzoate, 4-dimethylaminobenzoate-n-butoxyethylester, isoamyl-4-dimethylaminobenzoate, benzoate-2-dimethylaminoethylester, 4,4'-bis(dimethylamino)benzophenone, 4,4'-bis(diethylamino)benzophenone and 2,5'-bis(4-dimethylaminobenzal)cyclopentanone; organic peroxides selected from benzoyl peroxide, t-butylperoxy-2-ethylhexanoate, t-butylhydroperoxide, di-t-butylperoxyisophthalate, 3,3',4,4'-tetra(t-butylperoxycarbonyl)benzophenone and cumene peroxide; diphenyl halonium salts selected from diphenyl iodobromide and diphenyl iodochloride; aromatic ketones; tertiary amines; ketal compounds selected from acetophenonedimethylketal and benzyldimethylketal; thiol compounds selected from 2,4,5-triarylimidazole dimer, riboflavintetrabutylate, 2-mercaptobenzimidazole, 2-mercaptobenzoxazole and 2-mercaptobenzothiazole; halide compounds selected from 2,2,2-trichloro-1-(4'-tert-butylphenyl)ethane-1-one, 2,2-dichloro-1(4-phenoxyphenyl)ethane-1-one, α,α,α-tribromomethylphenylsulfone, 2,2,2-tribromoethanol, 2,4,6-tris(trichloromethyl)triazine, 2,4-bis(trichloromethyl)-6-(4-methoxyphenyl)triazine, 2,4-bis(trichloromethyl)-6-(4-methoxystyryl)triazine, 2,4-bis(trichloromethyl)-6-(3,4-methyleneoxyphenyl)triazine, 2,4-bis(trichloromethyl)-6-(4-methoxynaphthyl)triazine, 2,4-bis(trichloromethyl)-6-[2-(5-methylfuryl)ethylidine]triazine and 2,4-bis(trichloromethyl)-6-[2-burylethylidine]triazine; heterocyclic compounds, polycyclic compounds selected from 3-phenyl-5-isoxazolone, 2,4,6-tris(trichloromethyl)-1, 3,5-triazinebenzanthrone; bisimidazole compounds; N-allylglycidyl compounds; arcridine compounds; peroxy keta; azo compounds selected from 2,2'-azo(2,4-dimethylvaleronitrile), 2,2' azobisisobutyronitrile, 1,1' azobis(cyclohexane-1-carbonitrile) and 2,2'-azobis(2-methylbutyronitrile); iron-arene complex; and titanocene compounds.

Also, as examples of commercially available products of UV photo decolorants, Chivacure TPO, 200, 107, 184, 173, BDK, 660, 1400, 9842, 1256 and 3482, Irgacure 184, 369, 651, 500, 819, 907, 784, 2959, CGI1700, CGI1750, CGI1850 and CG24-61, Darocur 1116 and 1173(Ciba Specialty Chemicals Co., Ltd.), Lucirin TPO and LR8893(BASF), Ubecryl P36(UCB) can be given.

The initiator selected from a thermal initiator, UV photoinitiator and a mixture thereof is used in a content of 0.01 to 20 parts by weight, preferably 0.1 to 10 parts by weight for the 100 parts by weight of the organic solvent. When the content of the initiator is less than 0.01 parts by weight the decoloring efficient is lowered as the concentration of the initiator is insufficient and thus the ink printed on the recording medium is not completely erased. On the contrary, when the content of the initiator exceeds 20 parts by weight, the ink printed on the recording medium is completely erased, but a spot is generated on a surface of the recording medium or the decolorant is not removed during removal process of the decolorant since the decolorant is accumulated on the surface of the recording medium. Therefore, when the recording medium is repeatedly used more than two times, there is a risk that the decolorant is remained on the surface of the recording medium and thus reacts with the ink on the reused recording medium to decolor the ink.

The decolorant according to the present invention is prepared in such a manner that the initiator selected from a thermal initiator, UV photoinitiator and a mixture thereof is dissolved in the organic solvent selected from acetone, 2-butanone, alkylcellosolve, ethylacetate, acetonitrile and dimethylsulfoxide (DMSO) and other additives are then added thereto.

The decolorant may further include other additives for enhancing the properties of the decolorant. The decolorant including a surfactant as the additive can accelerate dissolution of the dye component of the printed ink to raise the reactivity of the decolorant with the dye. The surfactant is preferably the same as that used in the ink composition. The surfactant may be used alone or as a mixture of two or more surfactants. The surfactant is used in a content of 0.01 to 20 parts by weight, preferably 0.1 to 10 parts by weight for 100 parts by weight of the organic solvent.

The decolorant according to the present invention quickly penetrates into the printed ink to accelerate the reaction with the dye and is readily erased at lower temperature and light without discoloring the recording medium or swelling and deforming the recording medium.

The method for decoloring the printed ink includes 1) coating the decolorant including the initiator selected from a thermal initiator, UV photoinitiator and a mixture thereof on the recording medium printed with the ink prepared including the dye having a molecular structure in which an auxochrome is substituted at first to third carbon positions from a substituted carbon of a chromophore; and 2) decoloring the printed ink by applying heat or irradiating UV on the recording medium coated with the decolorant in the step 1).

Hereinafter, the method for decoloring an ink printed on a recording medium according to the present invention will be described in more detail.

First, the method for decoloring an ink by the decolorant including the thermal initiator (hereinafter, referred to as 'thermal decolorant') includes coating the thermal decolorant on the recording medium printed with the ink prepared using the dye according to the present invention in a roll manner or a spray manner; and applying heat to the recording medium, the heat having a temperature which allows the thermal initiator to form the radical and is determined according to the kind of the thermal initiator contained in the decolorant.

In the step of coating the thermal decolorant, since an equilibrium among the dye, the decoloring accelerator and the stabilizer is broken by coating the decolorant during the decoloring process, the ink printed on the recording medium in a shape of a character or a symbol is readily swelled to be uniformly mixed with the decolorant, thereby capable of decoloring the ink quickly and completely. Also, in the state in that the thermal decolorant is coated, since the heat of a predetermined temperature allowing the thermal initiator to be transformed into the radical is not applied, the ink on the recording medium is remained in the existing printed state.

In the step of applying the heat of a predetermined temperature, which allows the thermal initiator to form the radical, to the recording medium after coating the thermal decolorant, the temperature is determined according to the kind of the thermal initiator used in the thermal decolorant. The thermal decolorant is preferably not reacted at a room temperature, the decoloring of the ink by the thermal decolorant is carried out by applying the heat higher than a predetermined temperature. Also, the reaction temperature of thermal decolorant is preferably determined, in consideration of the properties of the recording medium, to a temperature at which the decoloring of the ink by the thermal decolorant can be carried out while the recording medium is not damaged. The temperature may be adjusted by an implementer through a direct experiment according to the composition of the ink and the composition of the thermal decolorant. In the long-term storage, since the thermal initiator is partially reacted at a temperature below the temperature at which the thermal initiator forms the radical, it is possible to decolor at a low temperature but the ink is erased during the reuse of the recording medium in the case the thermal initiator is remained on the recording medium. Therefore, it is advantageous to treat the recording medium at a high temperature provided that the recording medium is not transformed or damaged.

The method for decoloring the ink by the thermal decolorant takes relatively long time to decolor the recording medium but is able to decolor a great amount of recording media at once.

Also, the method for decoloring an ink by the decolorant containing the UV photoinitiator (hereinafter, referred to as 'photo decolorant') is the same as the method for decoloring an ink by the thermal initiator, except that the decolorant coated on the recording medium is the photo decolorant and the decoloring reaction is carried out by irradiating the UV of a predetermined wavelength instead of applying the heat. A light source for the UV has a wavelength ranged from 100 to 450 nm and preferably has a wavelength ranged from 200 to 420 nm in order to prevent generation of ozone. The light source is selected according to properties of the photo decolorant and the recording medium and the intensity of the light source has a range from 1 to 120 w/cm and preferably a range from 20 to 80 w/cm.

The method for decoloring an ink by the photo decolorant has an advantage that the decoloring reaction is completed within a short time of several seconds, but has disadvantages that in a case that the recording medium is a paper, only the ink on the surface of the recording medium is decolored by the UV and thus an afterimage is remained when a component of the paper or a cellulose and the ink are chemically coupled or the ink spreads and thus penetrates into an inside of the recording medium and the recording medium having a color is discolored when the recording medium is repeatedly used several times.

Also, in the method for decoloring an ink by the decolorant containing the mixture of the thermal initiator and the UV photoinitiator (hereinafter, referred to as 'thermal-photo decolorant'), the application of the heat and the irradiation of the UV may be used at the same time or in turn, or one of them may be used alone since the thermal initiator forms the radical by the heat and the photoinitiator forms the radical by the UV, and the formed radicals react with the auxochrome to destroy the dye respectively.

The method for decoloring an ink by the thermal-photo decolorant has an advantage that it is possible to decolor a great amount of recording media within a short time by the thermal initiator and the photoinitiator.

As the recording medium according to the present invention, a card with a magnetic stripe other than a general purpose paper may be used. In general, the magnetic card used as a pass card in toll gate of a highway or various identification card has higher production cost compared to a general recording medium such as a simple paper and is technically difficult to be recycled by regeneration of the recording medium after crushing up. Therefore, a considerable cost saving can be achieved when employing the method for decoloring an ink according to the present invention. The card with the magnetic stripe is a specially coated paper or a plastic material and can be printed with the ink according to the present invention regardless of the material. Therefore, the magnetic card can be recycled by using the method for decoloring an ink according to the present invention after collecting the magnetic card of which use in the state printed with the ink according to the present invention is completed.

Best Mode

Hereinafter, the embodiments of the present invention will be described in detail, but the present invention is not limited by the embodiments.

PREPARATION EXAMPLE 1

Reaction of the Decoloring Accelerator and the Stabilizer

Into 242 g (1 mole) of polyoxyethylene laurylamine, which is a decoloring accelerator, 540 g (2 mole) of oleic acid, which is the stabilizer, were put and then stirred by a stirrer of 100 rpm at a room temperature for 24 hours. The resultant product had a transparent brown color and showed a viscosity of 720 cp at 25° C.

Experimental Example 1

Experiment for Selecting Dye

In 95 g of TWEEN 80 (polyoxyethylene sorbitan monooleate, Aldrich), 5 g of dyes listed in following Table 1 were dissolved respectively to prepare inks. The prepared inks were then dyed on a silk fabric by 60% by weight for the weight of the silk fabric, thereby preparing stamp inks. The prepared stamp inks were sealed on a general office paper (A4) using a rubber stamp on which a character is embossed and dried for 72 hours, and thereafter used as test materials.

The decolorant was prepared by dissolving 2 g of hydroxycyclohexyl pentylketone in 100 g of 2-butanone.

The prepared decolorant was coated on the recording medium sealed with the stamp ink by a brush and the time taken for the dye on the recording medium to be completely erased was measured while irradiated using a 50 w/cm UV lamp. The results are shown in Table 1 below, in which the dye erased within 5 seconds is represented by ○, the dye erased within 10 seconds is represented by Δ and the dye not erased is represented by X. At that time, the distance between the lamp and the sample was maintained at 15 cm.

TABLE 1

| Name of dye | Decoloring |
|---|---|
| acid orange 10, basic violet 14, basic yellow 2, basic violet 4, basic violet2, acid blue 93, basic green 6B, acid violet 19, acid blue 40, acid black 132, acid blue 22, acid green 4, acid blue 6, acid green 1, basic green 4, acid green 5, acid black 1, basic green 2B, basic blue 8, acid blue 93, basic blue 20, basic orange 2, direct red 2, basic blue 26, basic violet 1, solvent orange 53, acid red 37, direct blue 71, solvent orange 52, basic blue 7, disperse blue 14, disperse red 13, disperse red 200, disperse red 60, disperse yellow 3, direct red 75, direct yellow 24 | ○ |
| Acid blue 62, acid brown 43, acid violet 1, acid violet 73, direct brown 106, direct red 28, disperse blue 183, disperse blue 3, disperse blue 79, disperse orange 3, disperse red 1, disperse yellow 54, solvent red 27 | Δ |
| Basic blue 162, basic blue 66, basic blue 9, basic brown 4, direct black 56, direct blue 7, direct red 23, disperse red 153 | X |

The dyes readily erasable by the decolorant are shown in Table 1. It can be seen that the dyes of which auxochrome is placed at α, β with respect to the chromophore and triarylmethane based dyes are readily erased, but dyes in which the auxochrome is farther spaced from the chromophore or which have two or more chromophores have a long erasing time or are not erased.

Experimental Example 2

Experiment for Stability by Reaction of Decoloring Accelerator and Stabilizer In order to confirm that the ink is decolored by the additives, inks were prepared by dissolving 7% by weight of solvent blue 5, which is a dye, in polyoxyethylenlaurylamine, oleic acid and the reaction product of the polyoxyethylenlaurylamine and the oleic acid (1:2) in Experimental Example 1, respectively. The prepared inks were then respectively dyed on a silk fabric by 23% by weight for the weight of the silk fabric and decoloring time and phenomenon are then observed at a room temperature (27±3° C.) The results are shown in Table 2 below.

| Dye | 7 wt % solvent blue 5 | | |
|---|---|---|---|
| Solvent | polyoxyethylen-laurylamine | oleic acid | reaction product of polyoxyethylen-laurylamine and oleic acid (1:2) |
| Decoloring time | 8 days | 30 days | 90 days |
| Eye observation | Completely decolored | Partially decolored and discolored | Not decolored |

From Table 2, it can be seen that the dye is gradually decolored by the decoloring accelerator and is also gradually decolored in the presence of an acid, but the ink prepared by mixing the reaction product, in which the stabilizer and the decoloring accelerator are previously reacted with each other, with the dye is not decolored.

Experimental Example 3

Experiment for Thermal Decoloring According to Composition of Ink

In order to test thermal decoloring properties according to composition of ink, inks containing 9% by weight of the dye were prepared by dissolving solvent blue 5 which is an erasable dye, in oleic acid, polyoxyethylenlaurylamine, the reaction product of the polyoxyethylenlaurylamine and the oleic acid in Experimental Example 1, benzylalcohol and polyethyleneglycol, respectively. The prepared inks were then dyed on a silk fabric by 60% by weight for the weight of the silk fabric, thereby preparing stamp inks. The prepared stamp inks were sealed on a general office paper (A4) using a rubber stamp on which a character is embossed and dried for 72 hours, and thereafter used as test materials. The thermal decolorant was prepared by dissolving 0.5 g of benzoyl peroxide in 100 g of acetone.

The thermal decolorant was coated on the recording medium sealed with the stamp ink by a brush and was left at a room temperature for 10 minutes. Thereafter, the time taken for the dye on the recording medium to be decolored was measured while the recording medium coated with the thermal decolorant was put in an over at 50° C. and then decolored for 48 hours, which is the time necessary for completely decomposing the thermal decolorant. The results are shown in Table 3 below. At that time, the complete decomposition of the thermal decolorant was confirmed by observing the time for which the character is not discolored while collecting samples on a per time basis, sealing the stamp again on the portion coated with the thermal decolorant and then put the sample again in the oven at 50° C.

TABLE 3

| | Dye 9 wt % solvent blue 5 Solvent | | | | |
|---|---|---|---|---|---|
| | reaction product of polyoxyethylenlaurylamine and oleic acid (mole) | Polyoxyethylenlaurylamine | oleic acid | Benzyl-alcohol | Polyethyleneglycol |
| Decoloring time (h) | 10 | 20 | 48 | 48 | 48 |
| Eye observation | Completely removed | | Almost erased but partially remained | Partially erased | Not erased at all |

From Table 3, it can be seen that in the case of coating the decolorant containing the thermal initiator, the recording medium printed with the ink is decolored quickly by applying heat.

Also, it can be seen that the recording medium printed with the ink is decolored most quickly when the reaction product of the polyoxyethylenlaurylamine and the oleic acid in Experimental Example 1 is used.

Experimental Example 4

Experiment for Selecting Solvent of Thermal Decolorant

The inks were prepared by the same method in Experimental Example 3 and sealed on a recording medium. The decolorants were prepared by dissolving 2 parts by weight of benzoyl peroxide which is a thermal initiator in respective organic solvents selected from 3-pentanone, 2-butanone, acetone, ethylacetate, ethanol, 2-buthoxyethanol, N-methylpyrrolidone, N,N-dimethylformamide and cyclohexane.

The respective thermal decolorants were coated on the sealed recording medium by a brush and were left at a room temperature for 10 minutes. Thereafter, they were put in an oven at 50° C. and then decolored for 48 hours. The dye erased within 48 hours is represented by ○, the dye partially removed is represented by Δ and the dye not erased is represented by X in Table 4 below.

TABLE 4

| Thermal initiator | Solvent | Decoloring time (hour) | Decoloring | Eye observation |
|---|---|---|---|---|
| Benzoyl peroxide | 2-pentanone | 6 | ○ | Completely removed |
| | 2-butanone | 10 | ○ | Completely removed |
| | Acetone | 11 | ○ | Completely removed |
| | Ethylacetate | 13 | ○ | Completely removed |

TABLE 4-continued

| Thermal initiator | Solvent | Decoloring time (hour) | Decoloring | Eye observation |
|---|---|---|---|---|
| | Ethanol | 48 | Δ | Afterimage |
| | 2-buthoxyethanol | 48 | Δ | Spread and afterimage |
| | N-methyl-pyrrolidone | 48 | Δ | Afterimage |
| | N,N-dimethyl-formamide | 48 | Δ | " |
| | Cyclohexane | 48 | X | " |

As shown in Table 4, it can be appreciated that specific solvents have to be used to prepare the decolorant so that the thermal initiator can readily form the radical by the heat. Particularly, when 3-pentanone, 2-butanone, acetone and ethylacetate are used as the solvent, the dyes were completely decolored within 13 hours.

Experimental Example 5

Experiment for Photo Decoloring According to Composition of Ink

In order to test photo decoloring properties according to composition of ink, inks were prepared by the same method in Experimental Example 3 and sealed on a recording medium. And, the photo decolorant was prepared by dissolving 1 g of hydroxycyclohexyl pentylketone in benzoyl peroxide in 100 g of 2-butanone. The prepared decolorant was coated on the recording medium sealed with the stamp ink by a brush and the time taken for the dye on the recording medium to be completely erased was measured while irradiated using a 50 w/cm UV lamp. The results are shown in Table 5 below, in which the dye erased within 5 seconds is represented by ○, the dye erased within 10 seconds is represented by Δ and the dye not erased is represented by X. At that time, the distance between the lamp and the sample was maintained at 15 cm.

TABLE 5

| | Dye 9 wt % solvent blue 5 Solvent | | | | |
|---|---|---|---|---|---|
| | reaction product of polyoxyethylenlaurylamine and oleic acid (1:2 mol) | Polyoxyethylenlaurylamine | oleic acid | benzylalcohol | Polyethyleneglycol |
| Decoloring Eye observation | ○ | ○ Completely removed | ○ | Δ Partially erased | Δ Partially erased but printed character is clearly seen |

From Table 5, it can be seen that in the case of coating the decolorant containing the photoinitiator and then applying energy by irradiating UV, the recording medium printed with the ink is quickly reacted and decolored.

Experimental Example 6

Experiment for Selecting Solvent of Photo Decolorant

In order to test for selecting solvent to be used in the preparation of decolorant, the stamp ink was prepared by dyeing the ink of Experimental Example 2 on a silk fabric by 60% by weight for the weight of the silk fabric and then was sealed on a general office paper (A4).

The decolorants were prepared by dissolving 2 parts by weight of 1-hydroxycyclohexyl pentylketone, which is a photoinitiator, in 98 parts by weight of respective organic solvents selected from acetone, methylcellosolve, 2-butanone, 2-butanone:methylcellosolve (1:1 in weight ratio), ethanol:methylcellosolve (1:1 in weight ratio), 1-butanol, ethylacetate, 2-butanol, ethanol and toluene. The respective prepared decolorants were coated on the recording medium printed with the ink by a brush and the decoloring time was measured while irradiated using a 50 w/cm UV lamp. The results are shown in Table 6 below, in which the dye erased within 5 seconds is represented by ○, the dye erased within 10 seconds is represented by Δ and the dye not erased is represented by X. At that time, the distance between the lamp and the sample was maintained at 15 cm.

TABLE 6

| Photoinitiator | Solvent | Decoloring |
|---|---|---|
| 1-hydroxycyclohexyl pentylketone | Acetone | ○ |
| | Methylcellosolve | ○ |
| | 2-butanone | ○ |
| | 2-butanone:methylcellosolve = 1:1 | ○ |
| | Ethanol:methylcellosolve = 1:1 | Δ |
| | 1-butanol | Δ |
| | ethylacetate | Δ |
| | 2-butanol | Δ |
| | Ethanol | X |
| | Toluene | X |

As shown in Table 6, it can be appreciated that specific solvents have to be used to prepare the decolorant so that the photoinitiator can readily form the radical by irradiating W. When acetone, methylcellosolve, 2-butanone, 1-butanol, ethylacetate and 2-butanol are used as the solvent, the dyes were decolored within 10 seconds. Particularly, when acetone, methylcellosolve and 2-butanone are used as the solvent, the dyes were decolored within 5 seconds.

Example 1

Printing ink

Into 54 g of reaction product of the decoloring accelerator and the stabilizer of Preparation Example 1 with being heated at 90° C., 1 g of the stearic acid was put and dissolved, followed by putting and mixing 5 g of benzylalcohol therein. And, 30 g of solvent blue 5, which is a dye, was put in the mixture, which was then stirred in high speed at 5000 rpm for 5 hours using a homomixer to be completely dissolved. Thereafter, log of paraffin oil was put in the mixture, which was then stirred at 10000 rpm for 1 hour using a stirrer. The stirred resultant was filtrated then cooled to a room temperature, thereby preparing a printing ink.

Example 2

Ribbon Ink

Into 70 g of reaction product of the decoloring accelerator and the stabilizer of Preparation Example 1, 5 g of benzylalcohol was put and mixed, which was then followed by putting 15 g of solvent blue 5, which is a dye. The mixture was stirred in high speed at 7000 rpm for 5 hours using a homomixer to be completely dissolved. Thereafter, 10 g of paraffin oil was put in the mixture, which was then stirred at 1000 rpm for 1 hour using a stirrer. Since the temperature of the mixture was raised to 80 to 90° C., the mixture was stood to be cooled to a room temperature and then filtrated, thereby preparing an ink for a ribbon cartridge.

Example 3

Deskjet Ink

Into 2 g of reaction product of the decoloring accelerator and the stabilizer of Preparation Example 1, 1.1 g of solvent blue 5, which is a dye, was put and mixed uniformly. To the resultant mixture, 9.3 g of polyoxyethylenelaurylamine and 3.7 g of polyoxyethylene isooctylphenyl ether were added in high speed 7000 rpm for 1 hour using a homomixer to be homogenized, followed by sequential addition of 4.7 g of N-methyl-2-pyrrolidone, 4.7 g of ethyleneglycol monophenyl ether and 41.9 g of ethanol, and then homogenized for 30 minutes. 32.6 g of water was finally put in the homogenized mixture and then homogenized for 1 hour, followed by filtration with membrane filter having a pore size of 5 μm, thereby preparing an inkjet ink for a printer.

Example 4

Ink for Writing Instruments

Into 78 g of reaction product of the decoloring accelerator and the stabilizer of Preparation Example 1, 2 g of benzylalcohol was put and mixed, which was then followed by putting 15 g of solvent blue 5, which is a dye. The mixture was stirred in high speed at 7000 rpm for 5 hours using a homomixer to be completely dissolved. Thereafter, 5 g of paraffin oil was put in the mixture, which was then stirred at 1000 rpm for 1 hour using a stirrer. Since the temperature of the mixture was raised to 80 to 90° C., the mixture was stood to be cooled to a room temperature and then filtrated, thereby preparing an ink for writing instruments.

Example 5

Preparation of Decolorant

The photo decolorant was prepared by dissolving 2 g of 1-hydroxycyclohexyl pentylketone, which is a photoinitiator, in 100 parts by weight of 2-butanone, and the thermal decolorant was prepared by dissolving 0.5 g of benzoyl peroxide in 100 g of acetone.

Example 6

Decoloring of Recording Medium Printed with Erasable Ink by Thermal Decolorant

<Printing Ink>
The printing ink prepared in Example 1 was dyes on a silk fabric by 60% by weight for the weight of the silk fabric and sealed on an A4 paper using a stamp, and then the paper was coated with the thermal decolorant prepared in Example 5. The solvent of the thermal decolorant on the coated paper was dried for 10 minutes, and the paper was put in an oven at 50° C. and the observed. Complete decoloring was observed after a lapse of 12 hours.
<Ribbon Ink>
The ribbon ink prepared in Example 2 was dyes on a ribbon by 23% by weight for the weight of the ribbon and printed on a A4 paper using a dot impact printer, and then the paper was coated with the thermal decolorant prepared in Example 5. The solvent of the thermal decolorant on the coated paper was dried for 10 minutes, and the paper was put in an oven at 50° C. and the observed. Complete decoloring was observed after a lapse of 10 hours.
<Inkjet Ink>
The Deskjet ink prepared in Example 3 was filled in an ink cartridge and printed out on general A4 paper using EPSON Stylus C43UX printer, and the paper was coated with the thermal decolorant prepared in Example 5. The solvent of the thermal decolorant on the coated paper was dried for 10 minutes, and the paper was put in an oven at 50° C. and the observed. Complete decoloring was observed after a lapse of 8 hours.
<Ink for Writing Instruments>
The ink for writing instruments prepared in Example 3 substituted for the original filling in MONAMI 153 ball point pen and written on general A4 paper, and the paper was coated with the thermal decolorant prepared in Example 5. The solvent of the thermal decolorant on the coated paper was dried for 10 minutes, and the paper was put in an oven at 50° C. and the observed. Complete decoloring was observed after a lapse of 11 hours.

Example 7

Decoloring of Recording Medium Printed with Erasable Ink by Photo Decolorant

<Printing Ink>
The printing ink prepared in Example 1 was dyes on a silk fabric by 60% by weight for the weight of the silk fabric and sealed on an A4 paper using a stamp, and then the paper was coated with the thermal decolorant prepared in Example 5. The H coated A4 paper was then irradiated using a 50 w/cm UV lamp at a distance from the lamp. Complete decoloring was observed within 7 seconds from the irradiation.
<Ribbon Ink>
The ribbon ink prepared in Example 2 was dyes on a silk ribbon by 23% by weight for the weight of the silk ribbon and printed on an A4 paper using a dot impact printer, and then the paper was coated with the thermal decolorant prepared in Example 5. The coated A4 paper was then irradiated using a 50 w/cm UV lamp at a distance from the lamp. Complete decoloring was observed within 5 seconds from the irradiation.
<Inkjet Ink>
The Deskjet ink prepared in Example 3 was filled in an ink cartridge and printed out on general A4 paper using EPSON Stylus C43UX printer, and the paper was coated with the thermal decolorant prepared in Example 5. The coated A4 paper was then irradiated using a 50 w/cm UV lamp at a distance from the lamp. Complete decoloring was observed within 4 seconds from the irradiation.
<Ink for Writing Instruments>
The ink for writing instruments prepared in Example 3 substituted for the original filling in MONAMI 153 ball point pen and written on general A4 paper, and the paper was coated with the thermal decolorant prepared in Example 5. The coated A4 paper was then irradiated using a 50 w/cm UV lamp at a distance from the lamp. Complete decoloring was observed within 6 seconds from the irradiation.

Example 8

Test for Decoloring According to Temperature by Thermal Decolorant

The ink was prepared by the same method in Example 6 and the time taken to be removed in an oven was measured with the temperature in the oven varying from 30° C. to 100° C. at a spacing of 10° C. The results are shown in Table 7 below.

TABLE 7

| Temperature | Time for removing ink |
| --- | --- |
| 30° C. | 53 hours |
| 40° C. | 45 hours |
| 50° C. | 23 hours |
| 60° C. | 7 hours |
| 70° C. | 1 hour and 28 minutes |
| 80° C. | 42 minutes |
| 90° C. | 25 minutes |
| 100° C. | 13 minutes |

INDUSTRIAL APPLICABILITY

According to the present invention, since it is possible to increase recycling effect of resources and minimize consumption of papers, it is possible to reduce the consumption of pulps almost of which are imported and thus save dollars, and reduce environment destruction and thus be environment friendly. In particular, when the present invention is applied to recording medium with a magnetic stripe as well as the general purpose papers of which use are sharply increased, it is possible to reduce the production cost significantly, obtain a large import substitution effect of the magnetic ink all of which are imported, and largely reduce the environmental pollution.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. An ink composition comprising: a dye having a molecular structure in which an auxochrome selected from an amino group(—$NH_2$), a secondary amino group (—NHR), a tertiary amino group (—$NR_2$), a hydroxyl group (—OH), a sulfone group ($SO_3$), a carboxyl group (—COOH), a mercapto group (—SH), an alkoxy group (—OR) or a halide (—X) is substituted at first to third carbon positions from a carbon which is substituted with a chromophore selected from an azo group (—N=N—), a carbonyl group (>C=O), a nitro group (—$NO_2$), a thiocarbonyl group (>C=S), a nitroso group (—N=O), an ethylene linkage (—C=C—) or a cyano group (—C=N—); and a reaction product of a decoloring accelerator and a stabilizer,
wherein the decoloring accelerator is one or a mixture of two or more selected from tertiary amino alcohols consisting of polyoxyethylenelaurylamine, ethanolamine, triethanolamine and diethanolamine, and
wherein the stabilizer is one or a mixture of two compounds selected from C10-C22 saturated fatty acid and C10-C22 unsaturated fatty acid.

2. The ink composition as set forth in claim 1, wherein the dye having a molecular structure in which an auxochrome selected from an amino group(—$NH_2$), a secondary amino group (—NHR), a tertiary amino group (—$NR_2$), a hydroxyl group (—OH), a sulfone group ($SO_3$), a carboxyl group (—COOH), a mercapto group(—SH), an alkoxy group (—OR) or a halide (—X) is substituted at first to third carbon positions from a carbon which is substituted with a chromophore selected from an azo group (—N=N—), a carbonyl group (>C=O), a nitro group (—$NO_2$), a thiocarbonyl group (>C=S), a nitroso group (—N=O), an ethylene linkage (—C=C—) or a cyano group (—C=N—), is selected from the group consisting of direct red 2, direct red 28, direct red 75, direct red 111, direct red 112, direct brown 106, direct blue 71, direct yellow 24, direct orange 61, disperse red 1, disperse red 13, disperse red 19, disperse red 60, disperse red 200, disperse violet 1, disperse violet 4, disperse black 1, disperse black 3, disperse black 7, disperse blue 1, disperse blue 3, disperse blue 14, disperse blue 19, disperse blue 79, disperse blue 134, disperse blue 183, disperse yellow 3, disperse yellow 54 or disperse orange 3, disperse orange 10, reactive blue 5, reactive blue 19, basic green 1, basic green 2B, basic green 4, basic green 6B, basic red 9, basic violet 1, basic violet 2, basic violet 3, basic violet 4, basic violet 14, basic violet 23, basic blue 1, basic blue 7, basic blue 8, basic blue 11, basic blue 15, basic blue 18, basic blue 20, basic blue 26, basic yellow 2, basic orange 2, solvent green 1, solvent red 5, solvent red 27, solvent violet 9, solvent brown 2, solvent blue 4, solvent blue 5, solvent blue 6, solvent blue 14, solvent blue 18, solvent blue 23, solvent blue 36, solvent yellow 1, solvent yellow 5, solvent yellow 56, solvent yellow 58, solvent orange 52, solvent orange 53, sulphur violet 2, acid green 1, acid green 4, acid green 5, acid red 37, acid red 53, acid violet 1, acid violet 19, acid violet 25, acid violet 73, acid brown 43, acid black 1, acid black 47, acid black 132, acid blue 6, acid blue 22, acid blue 24, acid blue 25, acid blue 27, acid blue 40, acid blue 56, acid blue 62, acid blue 74, acid blue 93, acid blue 145, and acid orange 10.

3. The ink composition as set forth in claim 1, wherein a mixed ratio of the decoloring accelerator and the stabilizer is an equivalence ratio of 1:1 to 1:3.

4. The ink composition as set forth in claim 1, wherein a content of the dye is 1 to 80% by weight and a content of the reaction product of the decoloring accelerator and the stabilizer is 1 to 95% by weight.

5. The ink composition as set forth in claim 1, wherein the ink composition further comprises a surfactant; a developer; a hydrophobic solvent of paraffin oil or mineral oil; and a hydrophilic solvent of water or alcohols.

6. The ink composition as set forth in claim 5, wherein the surfactant is one or a mixture of two or more selected from polyoxyethylene lauryl ether, polyoxyethylene stearyl ether, polyoxyethylene cetyl ether, polyoxyethylene oleyl ether, polyoxyethylene octylphenyl ether, polyoxyethylene nonylphenyl ether, polyoxyethylene polyoxypropylene block copolymers, sorbitan monolaurate, sorbitan monopalmitate, sorbitan monostearate, sorbitan monooleate, sorbitan trioleate, sorbitan tristearate, polyoxyethylene sorbitan monolaurate, polyoxyethylene sorbitan monopalmitate, polyoxyethylene sorbitan monostearate, polyoxyethylene sorbitan trioleate, polyoxyethylene sorbitan tristearate, fluorosurfactants, and silicon surfactants.

7. The ink composition as set forth in claim 6, wherein a content of the surfactant is 0.1 to 50% by weight.

8. The ink composition as set forth in claim 5, wherein the developer is selected from aliphatic alcohols and aromatic alcohols.

9. The ink composition as set forth in claim 8, wherein a content of the developer is 1 to 20% by weight.

10. The ink composition as set forth in claim 5, wherein a content of the hydrophobic and hydrophilic solvents is 1 to 90% by weight.

11. A printing ink, a ribbon cartridge ink, a Deskjet ink and a writing ink, comprising the ink composition as set forth in claim 1.

12. A method for decoloring an ink, comprising:
1) coating a decolorant comprising an initiator selected from a thermal initiator, a photoinitiator and a mixture of the thermal initiator and the photoinitiator; and an organic solvent selected from acetone, 2-butanone, alkylcellosolve, ethylacetate, acetonitrile and dimethylsulfoxide (DMSO) on a recording medium printed with an ink composition as set forth in claim 1; and 2) applying heat or irradiating UV on the recording medium coated with the decolorant in step 1.

13. The method for decoloring an ink as set forth in claim 12, wherein the recording medium is a general paper or a card on which a magnetic stripe is attached.

* * * * *